United States Patent
Son et al.

(10) Patent No.: US 10,745,532 B1
(45) Date of Patent: Aug. 18, 2020

(54) GENERALIZED METHOD FOR PRODUCING VERTICALLY ORIENTED BLOCK COPOLYMER FILM, BLOCK COPOLYMER FILM PRODUCED THEREBY AND METHOD FOR PRODUCING SELF-ASSEMBLED PATTERN

(71) Applicant: KOREA INSTITUTE OF SCIENCE AND TECHNOLOGY, Seoul (KR)

(72) Inventors: Jeong Gon Son, Seoul (KR); Jinwoo Oh, Seoul (KR); Sang-Soo Lee, Seoul (KR); Heesuk Kim, Seoul (KR); Min Park, Seoul (KR); Jong Hyuk Park, Seoul (KR); Seungjun Chung, Seoul (KR); Tae Ann Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/697,167

(22) Filed: Nov. 26, 2019

(30) Foreign Application Priority Data

Oct. 10, 2019 (KR) .................. 10-2019-0125094

(51) Int. Cl.
*C08J 5/18* (2006.01)
*B32B 27/28* (2006.01)
(Continued)

(52) U.S. Cl.
CPC ............. *C08J 5/18* (2013.01); *B32B 27/283* (2013.01); *B32B 27/302* (2013.01);
(Continued)

(58) Field of Classification Search
CPC ......... C08J 5/18; B32B 27/283; B43B 27/302
See application file for complete search history.

(56) References Cited

U.S. PATENT DOCUMENTS

| 2012/0228261 A1* | 9/2012 | Watanabe | ......... H01J 37/32357 216/41 |
| 2014/0011717 A1* | 1/2014 | Thornton | ............. C10M 147/04 508/100 |

(Continued)

OTHER PUBLICATIONS

Jinwoo Oh et al., "Generalized method for perpendicular orientation of block copolymer microdomains in thin films with surface crosslinking process", APS March Meeting 2019, Session V52.00006; Boston, Massachusetts, abstract. (Mar. 2019).

(Continued)

*Primary Examiner* — Dah-Wei D. Yuan
*Assistant Examiner* — Kristen A Dagenais-Englehart
(74) *Attorney, Agent, or Firm* — Rabin & Berdo, P.C.

(57) ABSTRACT

The present disclosure relates to a generalized method for producing a vertically oriented block copolymer film, a block copolymer film with controlled orientation obtained thereby, and a method for producing a self-assembled pattern. According to the present disclosure, it is possible to form a crosslinked layer, which is mechanically stable and undergoes no chemical change, by subjecting the block copolymer surface to plasma treatment using a filter. It is also possible to obtain a vertically oriented block copolymer film by annealing the block copolymer film having such a crosslinked layer. The method for producing a vertically oriented block copolymer film according to the present disclosure is advantageous in that it can be applied for general purpose regardless of the chemical structure, type and morphology of a block copolymer, and the method can be applied generally to the conventional directed self assembly process.

20 Claims, 11 Drawing Sheets

(51) Int. Cl.
*B32B 27/30* (2006.01)
*B82Y 30/00* (2011.01)
*B82Y 40/00* (2011.01)

(52) U.S. Cl.
CPC ....... *B32B 2255/26* (2013.01); *B32B 2305/72* (2013.01); *B32B 2307/514* (2013.01); *B32B 2310/14* (2013.01); *B82Y 30/00* (2013.01); *B82Y 40/00* (2013.01); *C08J 2325/08* (2013.01); *C08J 2383/04* (2013.01)

(56) References Cited

U.S. PATENT DOCUMENTS

2016/0042971 A1* 2/2016 Mohanty ............. H01L 21/0271
 438/705
2017/0287790 A1* 10/2017 Rastogi .................. H01L 22/12

OTHER PUBLICATIONS

Jinwoo Oh et al., "Universal perpendicular orientation of block copolymer microdomains using a filtered plasma", Nature Communications 10, Article No. 2912, https://doi.org/10.1038/s41467-019-10907-5, (Jul. 2019).
Kim, E. et al., "A Top Coat with Solvent Annealing Enables Perpendicular Orientation of Sub-10 nm Microdomains in Si-Containing Block Copolymer Thin Films", Adv. Funct. Mater. 24, 6981-6988 (Sep. 2014).
Son, J. G. et al., "High-Aspect-Ratio Perpendicular Orientation of PS-b-PDMS Thin Films under Solvent Annealing", ACS Macro Lett. 1, 1279-1284 (Oct. 2012).

* cited by examiner

GENERALIZED METHOD FOR PRODUCING VERTICALLY ORIENTED BLOCK COPOLYMER FILM, BLOCK COPOLYMER FILM PRODUCED THEREBY AND METHOD FOR PRODUCING SELF-ASSEMBLED PATTERN

CROSS-REFERENCE TO RELATED APPLICATIONS

This application claims, under 35 U.S.C. § 119, the priority of Korean Patent Application No. 10-2019-0125094 filed on Oct. 10, 2019 in the Korean Intellectual Property Office, the disclosure of which is incorporated herein by reference in its entirety.

TECHNICAL FIELD

The following disclosure relates to a generalized method for producing a vertically oriented block copolymer film, a block copolymer film with controlled orientation obtained thereby, and a method for producing a self-assembled pattern.

BACKGROUND

A block copolymer means a polymer formed by linear linkage of two or more different monomers. A block copolymer forms a specific nanostructure through annealing, wherein the size and morphology of the nanostructure vary with the type, molecular weight, molar ratio, annealing process, etc. of the block copolymer. Particularly, a block copolymer thin film means a thin film having a thickness of several nanometers to several hundreds of nanometers. In addition, when the orientation of the nanostructure of block copolymer is controlled in such a thin block copolymer film, the nanosturcture may be introduced to the next-generation nano-process through pattern transfer, or the like.

The orientation of block copolymer nanostructure is determined by various factors. In general, when the difference in interfacial energy of polymer blocks forming a block copolymer is large, the nanostructure is oriented generally in parallel with a substrate. However, it is required for the nanostructure to be oriented vertically in order to apply an ultramicro-pattern to metallization.

It is reported that a random copolymer, etc. having neutral interfacial energy is coated on the top or bottom in order to obtain a vertically oriented block copolymer nanostructure. According to the method reported to date, the vertical orientation method is limited to specific types of block copolymers. Moreover, a complicated process is required in order to realize vertical orientation, since a random polymer is synthesized and introduced to each of the top and bottom of a film all the time. Thus, there has been a significant limitation in practical application.

Meanwhile, plasma means a state of material separated into electrons, ions, or the like, under the application of energy to gas. Such plasma causes reactions, such as crosslinking and etching, in a material, and the reactions vary with the type of plasma gas. Plasma also generates ultraviolet rays and vacuum ultraviolet rays, can penetrate a polymer film to a depth of several hundreds of nanometers or more, and causes a chemical change to a relatively deep film.

Various reactive species formed from plasma may be controlled by using introduction of a material, such as glass, or a diaphragm. In addition, it is required to select reactive species in order to selectively modify the surface of a material. Reactive species from plasma generally include ions, radicals, electrons, ultraviolet rays, or the like. Ions, radicals and electrons cause chemical modification to a level of several nanometers from the surface, while ultraviolet rays cause chemical modification to a level of several hundreds of nanometers from the surface. Thus, it is required to inhibit ultraviolet rays selectively to carry out crosslinking on the surface of a block copolymer to a level of several nanometers.

REFERENCES

Non-Patent Documents (Non-Patent Documents 1) Son, J. G. et al. High-Aspect-Ratio Perpendicular Orientation of PS-b-PDMS Thin Films under Solvent Annealing. ACS Macro Lett. 1, 1279-1284 (2012).

(Non-Patent Document 2.) Kim, E., Kim, W., Lee, K. H., Ross, C. A. & Son, J. G. A Top Coat with Solvent Annealing Enables Perpendicular Orientation of Sub-10 nm Microdomains in Si-Containing Block Copolymer Thin Films. Adv. Funct. Mater. 24, 6981-6988 (2014).

SUMMARY

The present disclosure is designed to solve the problems of the related art, and an embodiment of the present disclosure is directed to providing a generalized method for producing a vertically oriented block copolymer film, a block copolymer film obtained thereby, and a method for producing a self-assembled pattern.

In one aspect of the present disclosure, there is provided a method for producing a vertically oriented block copolymer film, including the steps of: forming a block copolymer layer on a substrate; causing crosslinking on the surface of the block copolymer layer through plasma treatment using a filter to introduce a crosslinked layer; and carrying out annealing of the block copolymer layer having the crosslinked layer introduced thereto so that the nanostructure of the block copolymer layer may be vertically oriented, wherein the filter interrupts ultraviolet rays generated by the plasma.

In another aspect of the present disclosure, there is provided a method for producing a vertically oriented block copolymer film, including the steps of: coating a block copolymer on a substrate; converting the coated block copolymer into a first crosslinked layer through plasma treatment using a filter; forming a block copolymer layer including the same block copolymer as the above-mentioned block copolymer on the first crosslinked layer; and carrying out annealing of the block copolymer layer formed on the first crosslinked layer so that the nanostructure of the block copolymer layer may be vertically oriented, wherein the filter interrupts ultraviolet rays generated by the plasma.

In still another aspect of the present disclosure, there is provided a method for producing a vertically oriented block copolymer film, including the steps of: coating a block copolymer on a substrate; converting the coated block copolymer into a first crosslinked layer through plasma treatment using a filter; forming a block copolymer layer including the same block copolymer as the above-mentioned block copolymer on the first crosslinked layer; causing crosslinking on the surface of the block copolymer layer through plasma treatment using a filter to introduce a second crosslinked layer; and carrying out annealing of the block copolymer layer including the first crosslinked layer and the second crosslinked layer so that the nanostructure of the block copolymer layer may be vertically oriented, wherein the filter interrupts ultraviolet rays generated by the plasma.

In still another aspect of the present disclosure, there is provided a vertically oriented block copolymer film obtained by the method for producing a vertically oriented block copolymer film.

In still another aspect of the present disclosure, there is provided a method for producing a self-assembled pattern, including the steps of: preparing a substrate having a guide pattern; forming a block copolymer layer on the substrate having a guide pattern; causing crosslinking on the surface of the block copolymer layer through plasma treatment using a filter to introduce a crosslinked layer; and carrying out annealing of the block copolymer layer having the crosslinked layer introduced thereto so that the nanostructure of the block copolymer layer may be vertically oriented, wherein the filter interrupts ultraviolet rays generated by the plasma. In yet another aspect of the present disclosure, there is provided a self-assembled pattern obtained by the above-mentioned method.

According to the present disclosure, it is possible to form a mechanically stable crosslinked layer causing no chemical change through plasma treatment of the surface of the block copolymer using a filter. It is also possible to obtain a vertically oriented block copolymer film by annealing the block copolymer film having the crosslinked layer. The method for producing a vertically oriented block copolymer film according to the present disclosure may be used for general purpose regardless of the chemical structure, type and morphology of a block copolymer, and may be used generally for the existing directed self-assemblage processes.

BRIEF DESCRIPTION OF THE DRAWINGS

FIG. 2A illustrates a method for introducing a crosslinked layer to the top of a block copolymer layer, FIG. 2B illustrates a method for introducing a crosslinked layer to the bottom of a block copolymer layer, and FIG. 2C illustrates a method for introducing crosslinked layers to the top and bottom of a block copolymer layer.

DETAILED DESCRIPTION OF EMBODIMENTS

Figure 1:
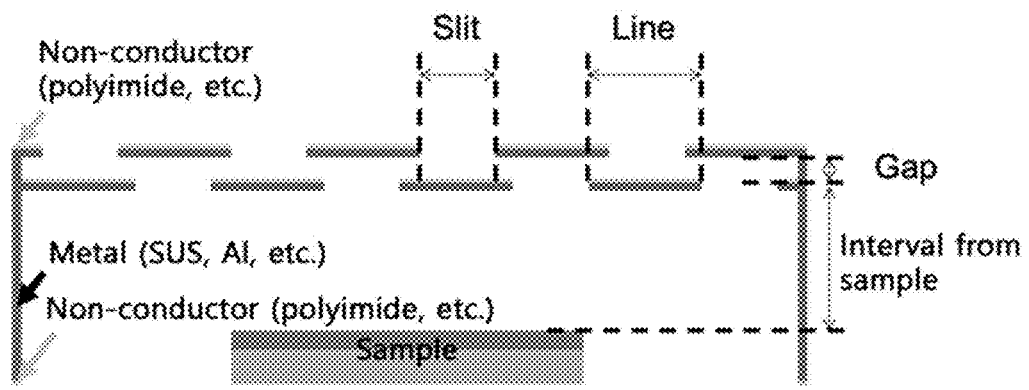
FIG. 1 is a schematic view illustrating the section of a filter used for plasma treatment according to an embodiment of the present disclosure.

Hereinafter, various aspects and embodiments of the present disclosure will be explained in more detail.

In one aspect of the present disclosure, there is provided a method for producing a vertically oriented block copolymer film, including the steps of: forming a block copolymer layer on a substrate; causing crosslinking on the surface of the block copolymer layer through plasma treatment using a filter to introduce a crosslinked layer; and carrying out annealing of the block copolymer layer having the crosslinked layer introduced thereto so that the nanostructure of the block copolymer layer may be vertically oriented, wherein the filter interrupts ultraviolet rays generated by the plasma.

The method for producing a vertically oriented block copolymer film according to the present disclosure includes inducing crosslinking of the surface of the block copolymer layer through plasma treatment to introduce a crosslinked layer. The plasma treatment is carried out by using a filter to interrupt ultraviolet rays. Various reactive species including ions, radicals, electrons and ultraviolet rays are generated from plasma. Herein, it has been found that when ultraviolet rays generated by plasma are interrupted selectively, it is possible to form a crosslinked layer effectively without etching of the surface of the block copolymer or without any change of the block volume fractions of the block copolymer. The present disclosure is based on this finding. When carrying out the plasma treatment, it is possible to form a thin crosslinked layer having a thickness of several nanometers on the surface of the block copolymer layer by interrupting ultraviolet rays having high penetrability and by using physical collision of neutral plasma species in order to perform selective modification of the surface. Since the crosslinked layer formed by plasma in which ultraviolet rays are interrupted selectively has the same chemical composition as the block copolymer, it can function as a neutral layer having neutral interfacial energy to the block copolymer. Therefore, it is possible to obtain a block copolymer film having vertical orientation through the annealing carried out subsequently.

In addition, the method according to the related art uses a complicated process, which includes synthesizing a random polymer having a controlled fraction and introducing it to a film all the time, in order to realize vertical orientation to a specific block copolymer. On the contrary, it has been found that the method for producing a vertically oriented block copolymer film according to the present disclosure may be applied for general purpose without any limitation in the type, morphology, molecular weight, etc. of a block copolymer, unlike the method for producing a vertically oriented block copolymer film according to the related art.

The method according to the present disclosure is advantageous in that vertical orientation can be accomplished through a simple and rapid process by using plasma treatment merely using a filter introduced thereto, as compared to the method according to the related art.

Therefore, the method for producing a vertically oriented block copolymer film according to the present disclosure may be applied as a novel patterning process for a next-generation semiconductor process with a thickness of 10 nm or less, and may also be applied to an ultramicro-transistor or memory device using the same.

In the method for producing a vertically oriented block copolymer film according to the present disclosure, the crosslinked layer is introduced to either surface or both surfaces of the block copolymer layer to control the nanostructure of the block copolymer film. When the crosslinked layer is introduced to either surface of the block copolymer film, only the nanostructure at the portion near the crosslinked layer of the block copolymer layer is oriented vertically. When the crosslinked layer is introduced to both surfaces of the block copolymer film, the nanostructure is oriented vertically over the whole block copolymer layer. The above-described method for producing a vertically oriented block copolymer film relates to a method for producing a block copolymer film having a crosslinked layer introduced to the top of the block copolymer layer.

In another aspect of the present disclosure, there is provided a method for producing a vertically oriented block copolymer film, including the steps of: coating a block copolymer on a substrate; converting the coated block copolymer into a first crosslinked layer through plasma treatment using a filter; forming a block copolymer layer including the same block copolymer as the above-mentioned block copolymer on the first crosslinked layer; and carrying out annealing of the block copolymer layer formed on the first crosslinked layer so that the nanostructure of the block copolymer layer may be vertically oriented, wherein the filter interrupts ultraviolet rays generated by the plasma. This method relates to a method for producing a block copolymer film having a crosslinked layer introduced to the bottom of the block copolymer layer.

In still another aspect of the present disclosure, there is provided a method for producing a vertically oriented block copolymer film, including the steps of: coating a block copolymer on a substrate; converting the coated block copolymer into a first crosslinked layer through plasma treatment using a filter; forming a block copolymer layer including the same block copolymer as the above-mentioned block copolymer on the first crosslinked layer; causing crosslinking on the surface of the block copolymer layer through plasma treatment using a filter to introduce a second crosslinked layer; and carrying out annealing of the block copolymer layer including the first crosslinked layer and the second crosslinked layer so that the nanostructure of the block copolymer layer may be vertically oriented, wherein the filter interrupts ultraviolet rays generated by the plasma. This method allows production of a block copolymer film having a nanostructure oriented vertically over the whole block copolymer layer through the introduction of crosslinked layers to both surfaces of the block copolymer layer.

As described above, the filter interrupts ultraviolet rays generated by the plasma. Any filter may be used without any limitation in materials or shapes, as long as it can interrupt ultraviolet rays. However, since the filter should perform a function of interrupting ultraviolet rays, it should be made of an opaque material. In addition, when the filter includes a single layer, it may not interrupt ultraviolet rays due to diffraction or interference. Thus, the filter preferably is a multilayer filter, such as a dual-layer or higher filter, and more preferably includes a dual-layer filter.

Hereinafter, the filter will be exemplified with reference to a dual-layer filter. FIG. 1 is a schematic view illustrating the section of the dual-layer filter used for the plasma treatment according to an embodiment of the present disclosure.

As can be seen from FIG. 1, the filter is a dual-layer filter including the first layer and the second layer, wherein the first layer and the second layer are in parallel with each other. The dual-layer filter includes a slit, which is an open portion of the first layer, and a line, which is a closed portion of the second layer. The slit has a length of 400-1000 μm, the line has a length of 1000-1600 μm, the gap between the first layer and the second layer is 200-1000 μm, and the line may be longer than the slit. The ranges of the slit, line and dual-layer gap may be varied, if necessary.

The filter may be made of a metallic material and is preferably coated with a non-conductor to avoid ground connection and contact. For example, the filter may be obtained by coating the surface of SUS with polyimide resin.

The filter preferably has a light transmission of 10% or less to the light with a wavelength of 100-500 nm as determined by UV-Vis spectroscopy, and the crosslinked layer preferably has a thickness of 1-10 nm.

It has been found that when the light transmission within the wavelength range is higher than 10%, the resultant crosslinked layer shows a rapid increase in thickness. In addition, the block copolymer undergoes a change in chemical composition, and thus no crosslinked layer having neutral affinity can be formed in each of the blocks forming the block copolymer. As a result, it is not possible to form a vertically oriented nanostructure having industrial applicability.

In addition, the crosslinked layer preferably has a thickness of 1-10 nm. The crosslinked layer is formed, while crosslinking is carried out by various materials generated from plasma. In the case of ultraviolet rays generated from plasma, they penetrate the block copolymer to a thickness of several hundreds of nanometers or more to cause chemical modification. However, since the method for producing a vertically oriented block copolymer film according to the present disclosure interrupts ultraviolet rays by using a filter, it is possible to form a crosslinked layer having a thickness of several nanometers. When the crosslinked layer is formed to a thickness less than 1 nm, it may be crashed down during annealing, and thus cannot function as a neutral layer. When the crosslinked layer is formed to a thickness larger than 10 nm, surface wrinkles may be generated undesirably after annealing.

The filter may interrupt ultraviolet rays and ions generated from plasma at the same time. When ions generated from plasma reach to the block copolymer layer and ion bombardment occurs, the resultant crosslinked layer shows a significant increase in density. This may cause a problem in that it is not possible to facilitate etching of the crosslinked layer for the purpose of forming a self-assembled pattern subsequently. Thus, it is preferred that the filter interrupts ultraviolet rays and ions generated from plasma at the same time.

The plasma treatment may use inert gas plasma or air plasma. The inert gas may include argon, nitrogen, or the like. When the plasma treatment includes oxygen, the block copolymer surface may be etched. Thus, it is preferred to use inert gas plasma.

The block copolymer includes the first block and the second block, and the contact angle of the crosslinked layer may have a value between the contact angle of the first block and that of the second block. It has been found that since the crosslinked layer, which is formed through the plasma treatment in which ions and ultraviolet rays are interrupted by using a filter as described above, causes no change in chemical composition of the block copolymer and has the same surface energy as pure block copolymer, it has substantially the same contact angle as the contact angle of pure block copolymer. In other words, since the block copolymer including the first block and the second block has a contact angle between the contact angle of the first block and that of the second block, the block copolymer film having a crosslinked layer formed through the plasma treatment using a filter also has a contact angle between the contact angle of the first block and that of the second block. On the contrary, in the case of a block copolymer subjected to plasma treatment using no filter, it has been found that the block copolymer has a contact angle significantly smaller than the contact angle of pure block copolymer.

The annealing may be heat treatment or solvent vapor treatment. The heat treatment may be carried out at a temperature of 100-300° C. under vacuum or inert gas atmosphere. The heat treatment time and temperature may vary with the type, thickness, etc. of the block copolymer. For example, in the case of polystyrene-block-poly(dimethylsiloxane) (PS-b-PDMS), the heat treatment may be carried out at a temperature of 180-220° C. for 1-3 hours. In the case of solvent vapor treatment, it may be carried out by allowing solvent gas to be absorbed to a polymer film for a predetermined time and removing it, as known generally in the art. The solvent used for the solvent vapor treatment varies depending on the type of block copolymer, and also depends on time and the type or thickness of block copolymer.

In still another aspect of the present disclosure, there is provided a vertically oriented block copolymer film obtained by the method for producing a vertically oriented block copolymer film.

In still another aspect of the present disclosure, there is provided a method for producing a directed self-assembled pattern, including the steps of: preparing a substrate having a guide pattern; forming a block copolymer layer on the substrate having a guide pattern; causing crosslinking on the surface of the block copolymer layer through plasma treatment using a filter to introduce a crosslinked layer; and carrying out annealing of the block copolymer layer having the crosslinked layer introduced thereto so that the nanostructure of the block copolymer layer may be vertically oriented, wherein the plasma treatment is carried out by selectively interrupting ions and ultraviolet rays generated by the plasma. It has been shown that the method for inducing vertical orientation of the block copolymer by selectively interrupting ions and ultraviolet rays generated from plasma as described above with reference to the method for producing a vertically oriented block copolymer can be applied to directed self-assembly (DSA) to obtain a self-assembled pattern. The method for producing a self-assembled pattern according to the present disclosure is advantageous in that it can be applied for general purpose regardless of the chemical structure, type and morphology of a block copolymer, in the same manner as the method for producing a vertically oriented block copolymer film.

The filter preferably has a light transmission of 10% or less to the light with a wavelength of 100-500 nm as determined by UV-Vis spectroscopy, and the crosslinked layer preferably has a thickness of 1-10 nm.

The filter may interrupt ultraviolet rays and ions generated from plasma at the same time.

The plasma treatment may use inert gas plasma or air plasma.

The block copolymer includes the first block and the second block, and the contact angle of the crosslinked layer may have a value between the contact angle of the first block and that of the second block.

Detailed description of the method for producing a directed self-assembled pattern according to the present disclosure will be omitted herein, since it is the same as described above with reference to the method for producing a vertically oriented block copolymer film according to the present disclosure.

In yet another aspect of the present disclosure, there is provided a directed self-assembled pattern obtained by the above-mentioned method.

The examples and experiments will now be described. The following examples and experiments are for illustrative purposes only and not intended to limit the scope of this disclosure. In addition, it will be apparent to those skilled in the art that various changes and modifications may be made based on the disclosure of the present disclosure including the following examples, and the changes and modifications are also within the scope of the present disclosure as defined in the following claims.

Figure 2A:
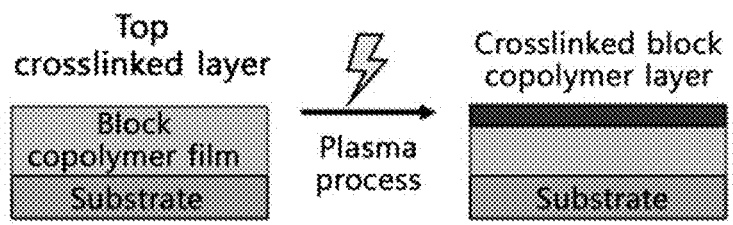
FIGS. 2A to 2C are schematic views illustrating the method for producing a block copolymer film according to an embodiment of the present disclosure.
Figure 2B:
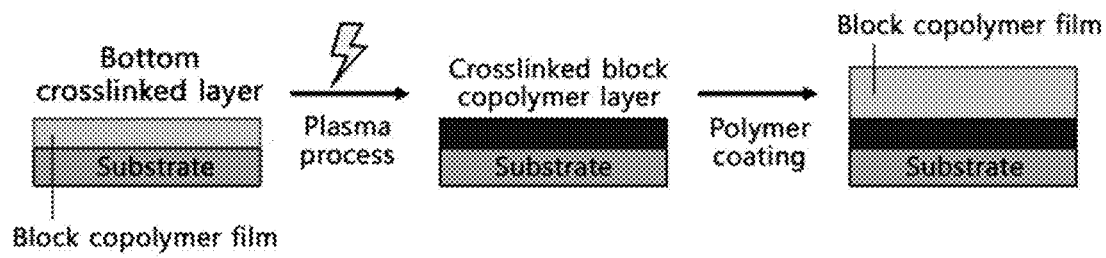
Figure 2C:
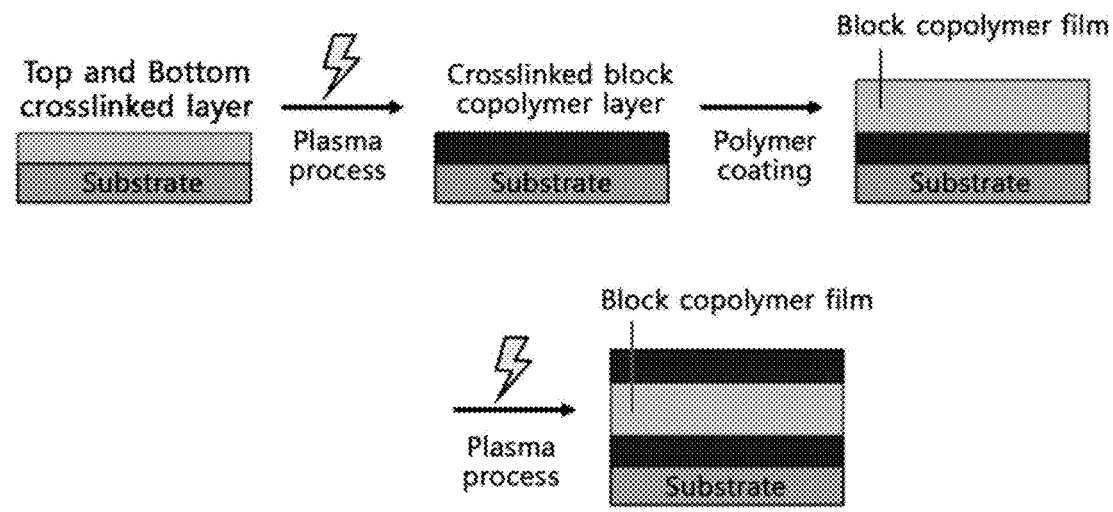

Example 1. Production of Vertically Oriented Block Copolymer Film Through Plasma Treatment Using Filter To determine the effect of plasma treatment using introduction of a crosslinked layer and a filter, a block copolymer was prepared as follows. Each of PS-b-PMMA (50 k-48 k, SML), PS-b-PDMS (11 k-5 k, SDC and 22 k-21 k, SDL), PS-b-P2VP (40 k-44 k, SVL) and P2VP-b-PS-b-P2VP (12 k-23 k-12 k, VSVL) was purchased from PolymerSource Inc. Each of the block copolymer films including a top crosslinked layer, a bottom crosslinked layer or both of a top crosslinked layer and a bottom crosslinked layer was prepared by subjecting the block copolymer film to plasma treatment using a filter. FIGS. 2A to 2C are schematic views illustrating the method for producing a block copolymer film according to an embodiment of the present disclosure. FIG. 2A shows a method for introducing a crosslinked layer to the top of the block copolymer layer, FIG. 2B shows a method for introducing a crosslinked layer to the bottom of the block copolymer layer, and FIG. 2C shows a method for introducing crosslinked layers to both of the top and bottom of the block copolymer layer. Hereinafter, embodiments of the method for producing a block copolymer film by introducing a crosslinked layer to the top, bottom or top and bottom of the block copolymer will be explained in detail.

Production of Block Copolymer Film through Top Plasma Treatment

Each of PS-b-PMMA (introduced at a concentration of 30 mg/mL to a mixture containing chloroform and acetone at a volume ratio of 9:1), PS-b-PDMS (introduced at a concentration of 30 mg/mL to cyclohexane), PS-b-P2VP and P2VP-b-PS-b-P2VP (introduced at a concentration of 30 mg/mL to chloroform) prepared as described above was spin coated on a silicon wafer under 6000 rpm for 30 seconds to obtain a block copolymer film having a thickness of 200 nm.

Next, plasma treatment using a filter was carried out through a reactive ion etching system (Plasma Pro 800 RIE, Oxford Inc., Ar flow rate 50 sccm, 15 mTorr). The filter used for the plasma treatment had a slit size of 800 μm, line size of 1200 μm and a dual-layer gap of 300 microns, and was set with an interval from a sample of 3000 μm. FIG. 1 is a schematic view illustrating the filter used for the plasma treatment according to an embodiment of the present disclosure. The block copolymer film subjected to plasma treatment was annealed at 220° C. under vacuum for 3 hours (in the case of PS-b-PDMS and PS-b-P2VP, solvent vapor treatment was carried out by using acetone and chloroform, respectively, in a 9.3 mL chamber for 30 minutes) to obtain a block copolymer film.

Production of Block Copolymer Film through Bottom Plasma Treatment

After a block copolymer film having a thickness of 7 nm was spin coated on a silicon wafer, argon plasma treatment using a filter was carried out to form a crosslinked layer. After a block copolymer film having a thickness of 200 nm was spin coated on the crosslinked layer, annealing was carried out to obtain a block copolymer film. The details were the same as the above-described method for producing a block copolymer film through top plasma treatment.

Production of Block Copolymer Film Through Top and Bottom Plasma Treatment

After a block copolymer film having a thickness of 7 nm was spin coated on a silicon wafer, argon plasma treatment (RF power 200 W, 10 seconds) using a filter was carried out to form a crosslinked layer. After a block copolymer film having a thickness of 200 nm was spin coated on the crosslinked layer, the block copolymer film surface was subjected to plasma treatment to for a top crosslinked layer. Next, the block copolymer film having crosslinked layers at the top and bottom thereof was annealed. The details, including the block copolymer, plasma treatment, spin coating and annealing, were the same as the above-described method for producing a block copolymer film through top plasma treatment.

Figure 3:
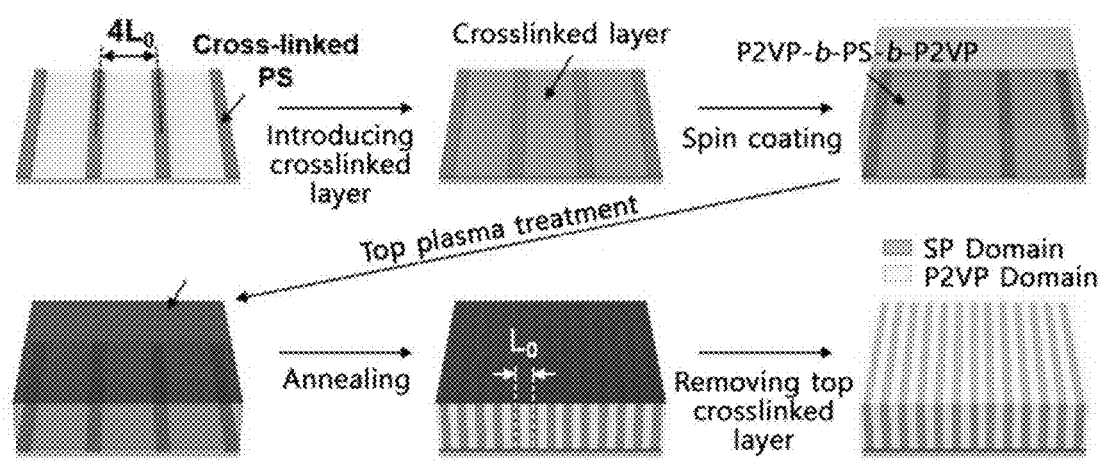
FIG. 3 is a schematic view illustrating a process for producing a directed self-assembled block copolymer film on a chemical pattern.

Example 2. Production of Directed Self-Assembled Block Copolymer Vertical Nanostructure on Chemical Pattern To determine the compatibility of the method for producing a block copolymer film through plasma treatment using a filter according to Example 1 with the directed self-assembly (DSA) process, the method according to Example 1 was applied to the conventional directed self-assembly process using a chemical pattern to obtain a block copolymer film. FIG. 3 is a schematic view illustrating the process for producing a directed self-assembled block copolymer film on a chemical pattern.

A line pattern having a thickness of 7.5 nm, a width of 16 nm and a pitch of 84 nm was fabricated on a substrate including silicon nitride having a thickness of 13 nm. PMMS brushes having neutral affinity to PS and P2VP were attached to the region not coated with the pattern to form a guide pattern.

Then, P2VP-b-PS-b-P2VP film having a thickness of 46 nm was spin-coated on the guide pattern and subjected to plasma treatment (Ar, 200W, 10 s) using a filter, and thermally annealed at 240° C. for 3 hours to obtain a directed self-assembled block copolymer film on a chemical pattern.

Comparative Example 1. Production of Block Copolymer Film Using No Plasma Treatment A block copolymer film was obtained in the same manner as Example 1, except that no plasma treatment was carried out.

Comparative Example 2. Production of Block Copolymer Film Through Plasma Treatment Using No Filter A block copolymer film was obtained in the same manner as Example 1, except that plasma treatment was carried out by using no filter.

Test Example 1. Scanning Electron Microscopy (SEM) Analysis

The surface of each of the block copolymer films according to Example 1, Comparative Example 1 and Comparative Example 2 was analyzed through scanning electron microscopy (SEM) and the nanostructure of each film was determined.

Figure 4:
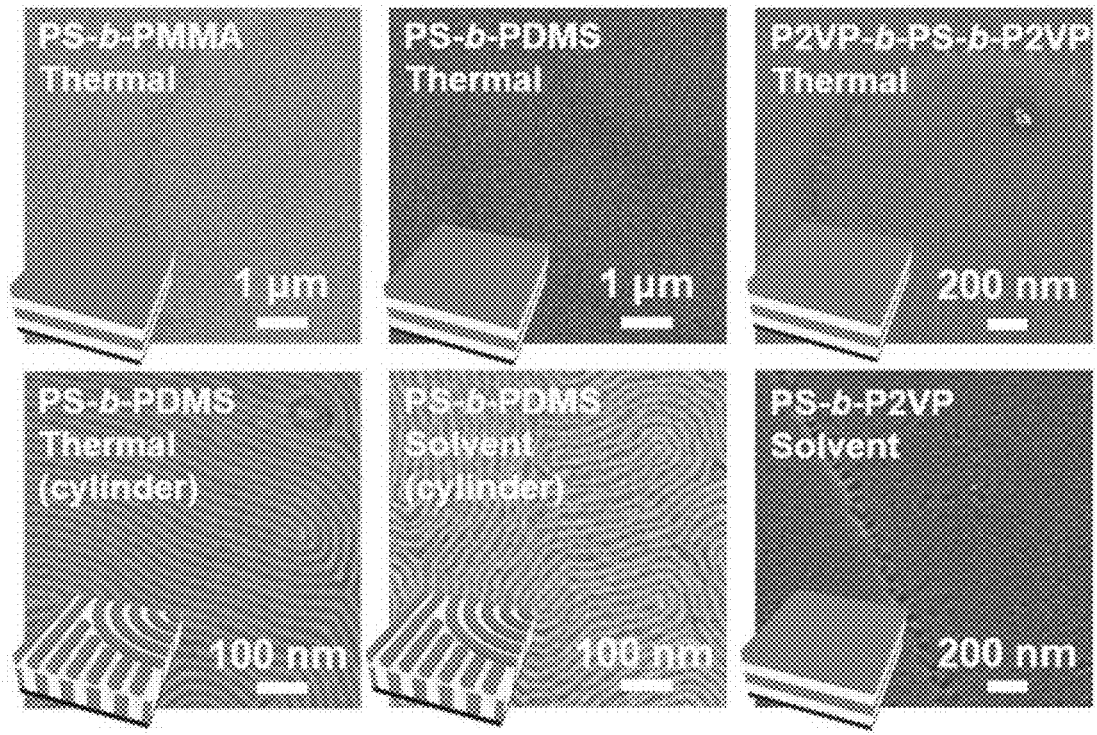
FIG. 4 shows schematic views illustrating the nanostructure of the block copolymer film having no crosslinked layer according to Comparative Example 1 and scanning electron microscopic (SEM) images illustrating the surface analysis results.

FIG. 4 shows schematic views illustrating the nanostructure of the block copolymer film having no crosslinked layer according to Comparative Example 1 and SEM images illustrating the surface analysis results. FIG. 4 shows the nanostructure schematic views and surface SEM images of the block copolymer films obtained through PS-b-PMMA heat treatment, PS-b-PDMS heat treatment, P2VP-b-PS-b-P2VP heat treatment, PS-b-PDMS (cylinder) heat treatment, PS-b-PDMS (cylinder) solvent treatment, and PS-b-P2VP solvent treatment, when viewed from the left top side in the clockwise direction. As can be seen from FIG. 4, the block copolymer having a lamella structure has a terrace shape corresponding to a horizontal lamella structure, and the block copolymer having a cylinder structure has a fingerprint-like horizontally oriented cylinder structure.

Figure 5:
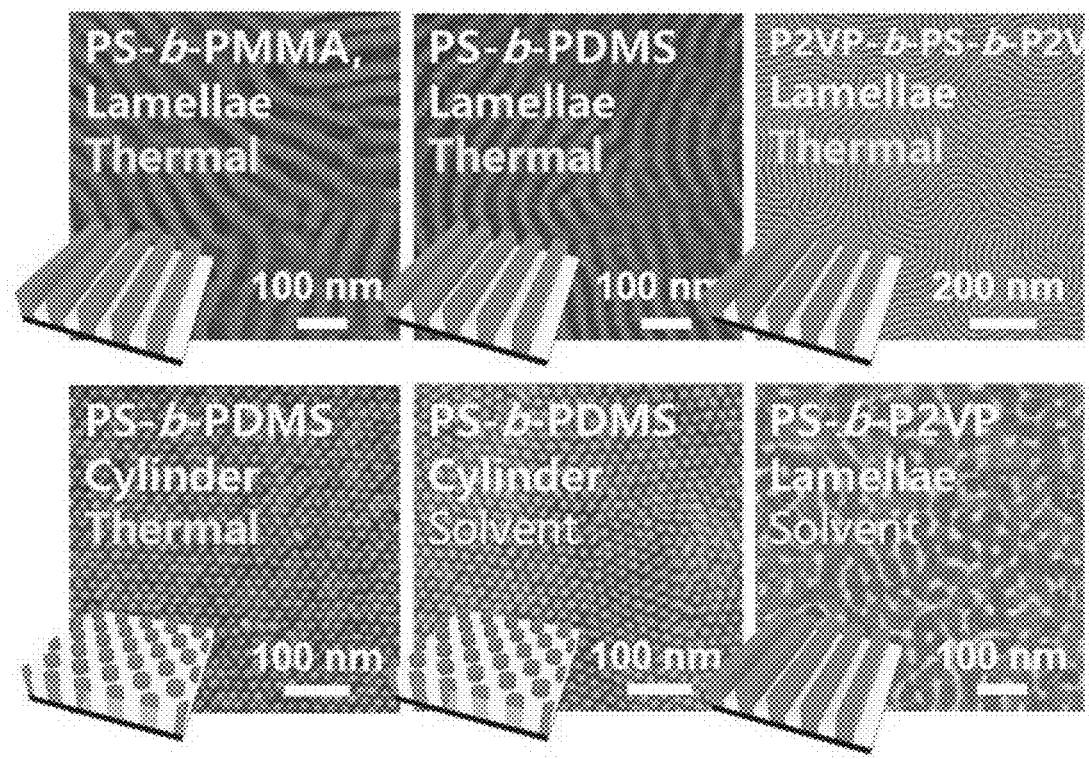
FIG. 5 shows schematic views illustrating the block copolymer having a crosslinked layer introduced through plasma treatment using a filter according to Example 1 and SEM images illustrating the surface analysis results.

FIG. 5 shows schematic views illustrating the block copolymer having a crosslinked layer introduced through plasma treatment using a filter according to Example 1 and SEM images illustrating the surface analysis results. FIG. 5 shows the results of the block copolymer film subjected to the top and bottom plasma treatment using a filter in Example 1. FIG. 5 shows the nanostructure schematic views and surface SEM images of the block copolymer films obtained through PS-b-PMMA (lamella) heat treatment, PS-b-PDMS (lamella) heat treatment, P2VP-b-PS-b-P2VP (lamella) heat treatment, PS-b-PDMS (cylinder) heat treatment, PS-b-PDMS (cylinder) solvent treatment, and PS-b-P2VP (lamella) solvent treatment, when viewed from the left top side in the clockwise direction. The nanostructure morphology of the block copolymer film obtained according to Example 1 was determined and the crosslinked layer thereof should be removed for the purpose of application, and oxygen plasma was used to remove the crosslinked layer. As can be seen from FIG. 5, vertically oriented lamellae and cylinders are found in the case of the block copolymer having a crosslinked layer introduced thereof, unlike the block copolymer film having no crosslinked layer introduced thereto as shown in FIG. 4.

Figure 6:
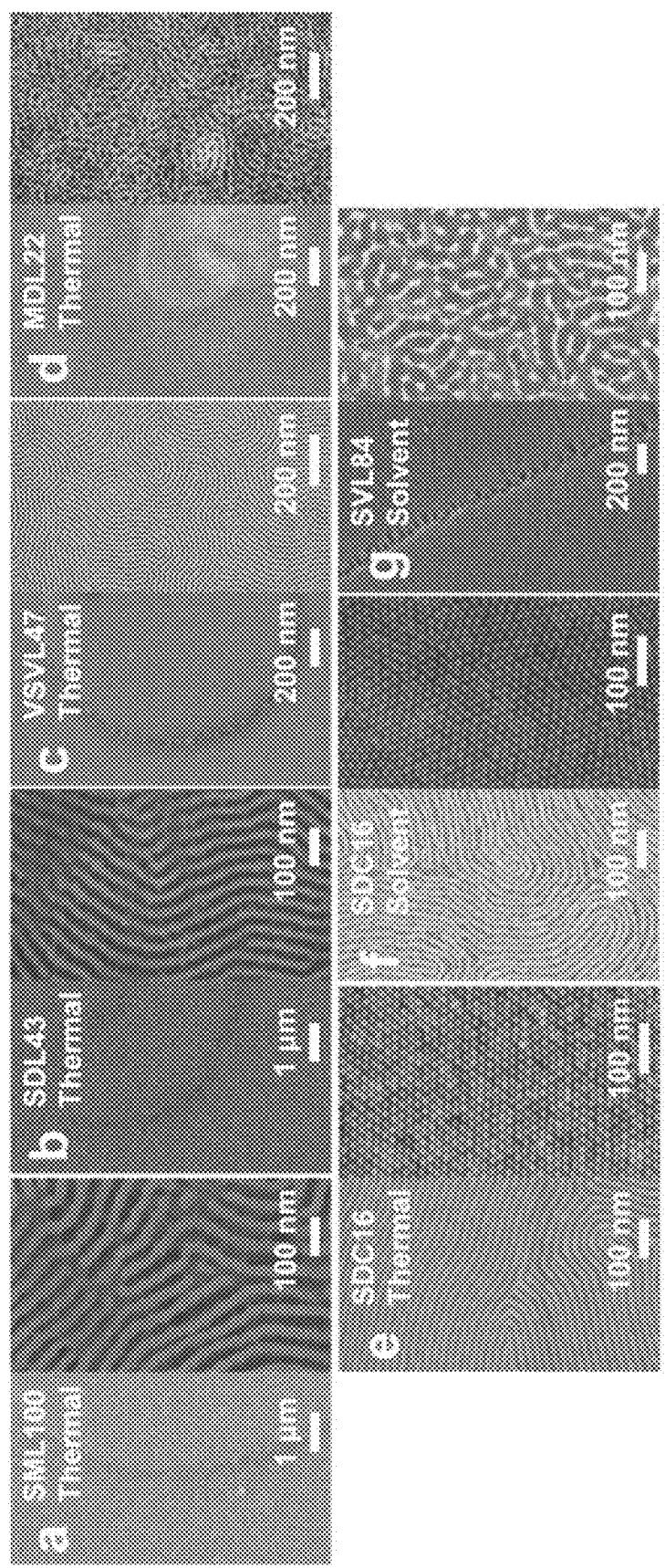
FIG. 6 shows SEM images illustrating the surface analysis results of the block copolymer films obtained according to Example 1 and Comparative Example 2.

FIG. 6 shows SEM images illustrating the surface analysis results of the block copolymer films obtained according to Example 1 and Comparative Example 2. FIG. 6*a* shows an SEM image of the block copolymer film obtained through PS-b-PMMA (SML100) heat treatment, FIG. 6b shows an SEM image of the block copolymer film obtained through PS-b-PDMS (SDL43, lamella) heat treatment, FIG. 6c shows an SEM image of the block copolymer film obtained through P2VP-b-PS-b-P2VP (VSVL47) heat treatment, FIG. 6d shows an SEM image of the block copolymer film obtained through PMMA-b-PDMS (MDL22) heat treatment, FIG. 6e shows an SEM image of the block copolymer film obtained through PS-b-PDMS (SDC16, cylinder) heat treatment, FIG. 6f shows an SEM image of the block copolymer film obtained through PS-b-PDMS (SDC16) solvent treatment, and FIG. 6g shows an SEM image of the block copolymer film obtained through PS-b-P2VP (SVL84) solvent treatment. Each of the left-side images in FIG. 6a to FIG. 6g shows an SEM image of the film according to Comparative Example 2, and each of the right-side images therein shows an SEM image of the film according to Example 1. As can be seen from FIG. 6, Comparative Example 2 using no filter shows a cascade structure including parallel lamellae and cylinders with an insufficient thickness. On the contrary, the block copolymer film obtained through plasma treatment using a filter forms a structure including vertically oriented lamellae and cylinders.

The surface and section of PS-b-PDMS film obtained through top, bottom, and top and bottom plasma treatment according to Example 1 were analyzed by SEM.

Figure 7A:
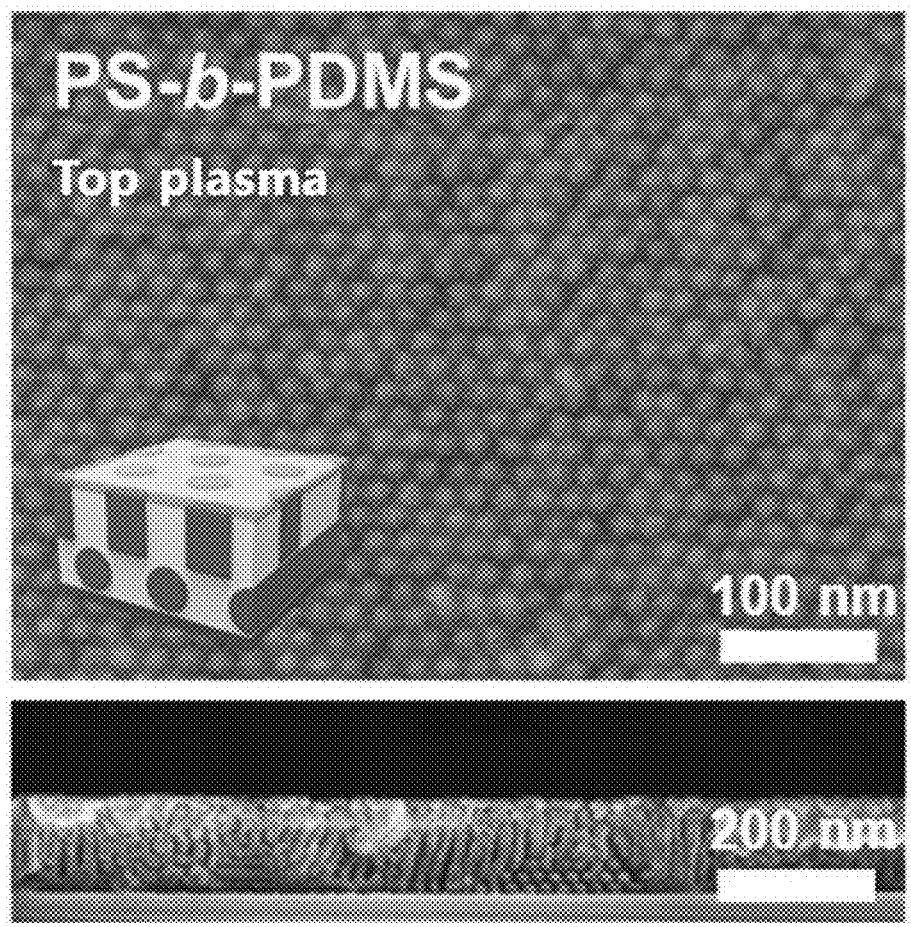
FIG. 7A shows a schematic view illustrating the PS-b-PDMS film obtained by plasma treatment on the top according to an embodiment of the present disclosure, and SEM analysis results of the surface and section thereof.

FIG. 7A shows a schematic view illustrating the PS-b-PDMS film obtained by plasma treatment on the top according to an embodiment of the present disclosure, and SEM analysis results of the surface and section thereof. As can be seen from FIG. 7A, a block copolymer film having vertical orientation at the top portion subjected to plasma treatment is formed.

Figure 7B:
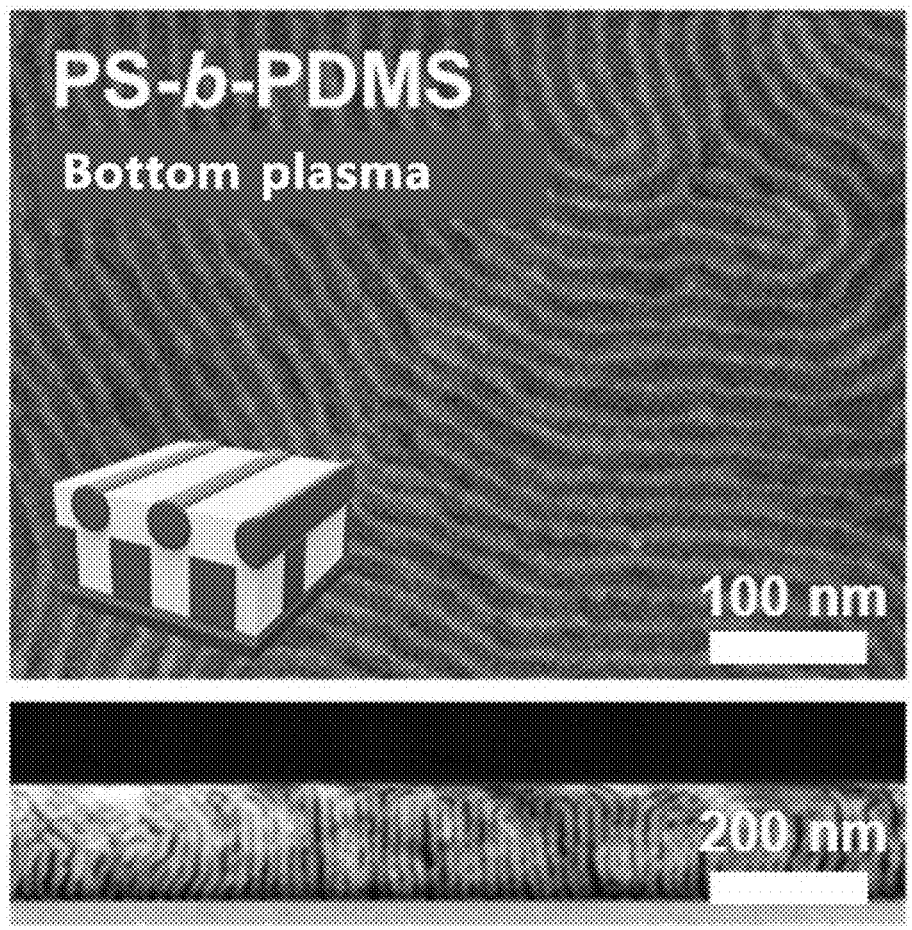
FIG. 7B shows a schematic view illustrating the PS-b-PDMS film obtained by plasma treatment on the bottom according to an embodiment of the present disclosure, and SEM analysis results of the surface and section thereof.

FIG. 7B shows a schematic view illustrating the PS-b-PDMS film obtained by plasma treatment on the bottom according to an embodiment of the present disclosure, and SEM analysis results of the surface and section thereof. As can be seen from FIG. 7B, a block copolymer film having vertical orientation at the bottom portion subjected to plasma treatment is formed.

Figure 7C:
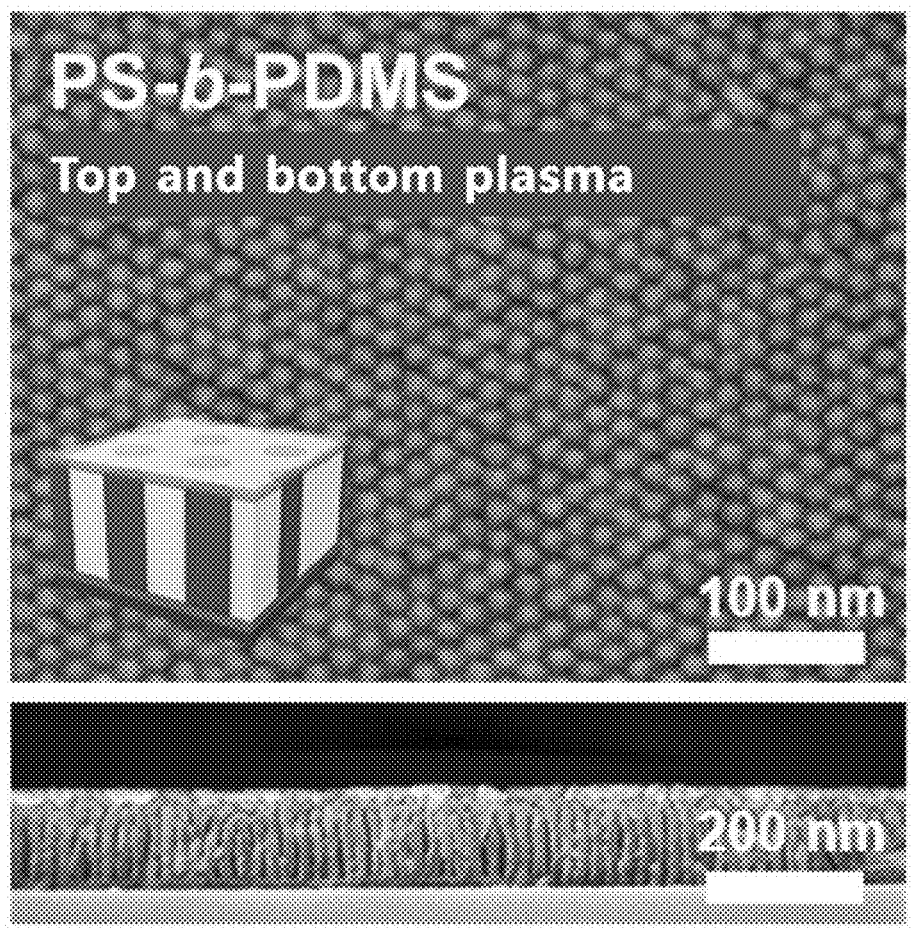
FIG. 7C shows a schematic view illustrating the PS-b-PDMS film obtained by plasma treatment on the top and bottom according to an embodiment of the present disclosure, and SEM analysis results of the surface and section thereof.

FIG. 7C shows a schematic view illustrating the PS-b-PDMS film obtained by plasma treatment on the top and bottom according to an embodiment of the present disclosure, and SEM analysis results of the surface and section thereof. As can be seen from FIG. 7C, a block copolymer film having vertical orientation over the whole block copolymer film from the top to the bottom is formed.

Figure 8:
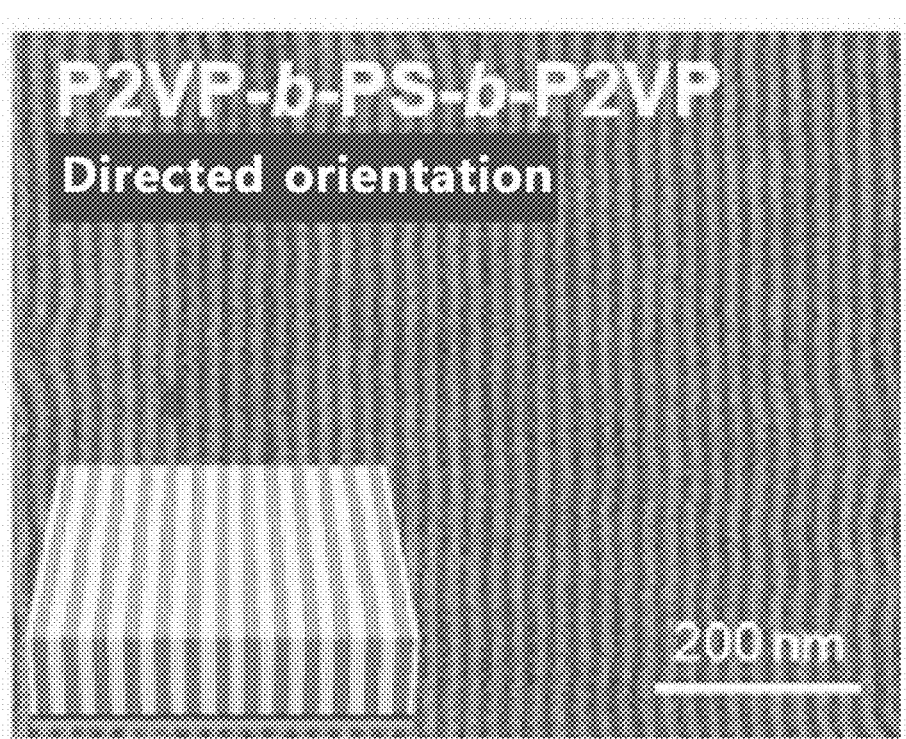
FIG. 8 shows an SEM image illustrating the surface of the vertically oriented lamella block copolymer film obtained by using a directed self-assembly process according to Example 2.

FIG. 8 shows an SEM image illustrating the surface of the vertically oriented lamella block copolymer film obtained by using a directed self-assemblage process according to Example 2. As can be seen from FIG. 8, a block copolymer film aligned with a pattern having a width of 9.5 nm is formed. In other words, it can be seen that the method for producing a vertically oriented block copolymer film through plasma treatment using a filter can be applied successfully to the conventional DSA process using a chemical pattern with 10 nm or less.

Test Example 2. X-Ray Photon Spectroscopy and Contact Angle Determination of Crosslinked Layer Each of the block copolymer films according to Example 1 and Comparative Example 2 was analyzed by X-ray photoelectron spectroscopy (XPS) and the water contact angle thereof was determined to examine the effect of plasma using a filter upon the block copolymer film.

Figure 9A:
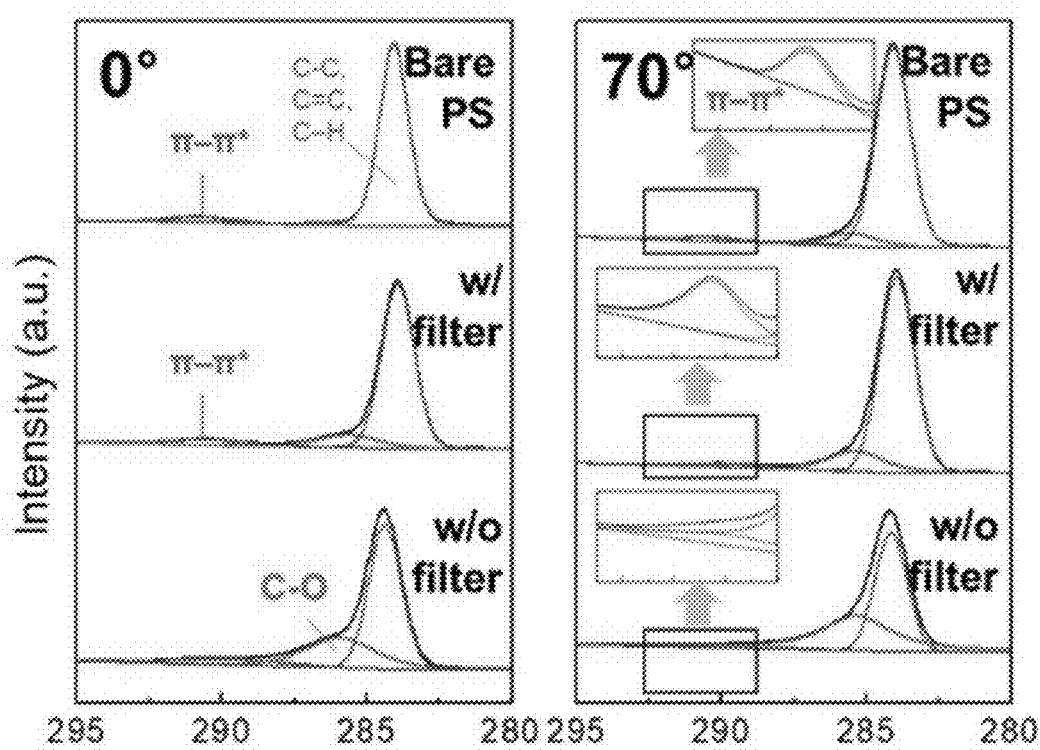
FIGS. 9A and 9B are graphs illustrating the results of X-ray photon spectroscopy (XPS) of the block copolymers according to Example 1 and Comparative Example 2.
Figure 9B:
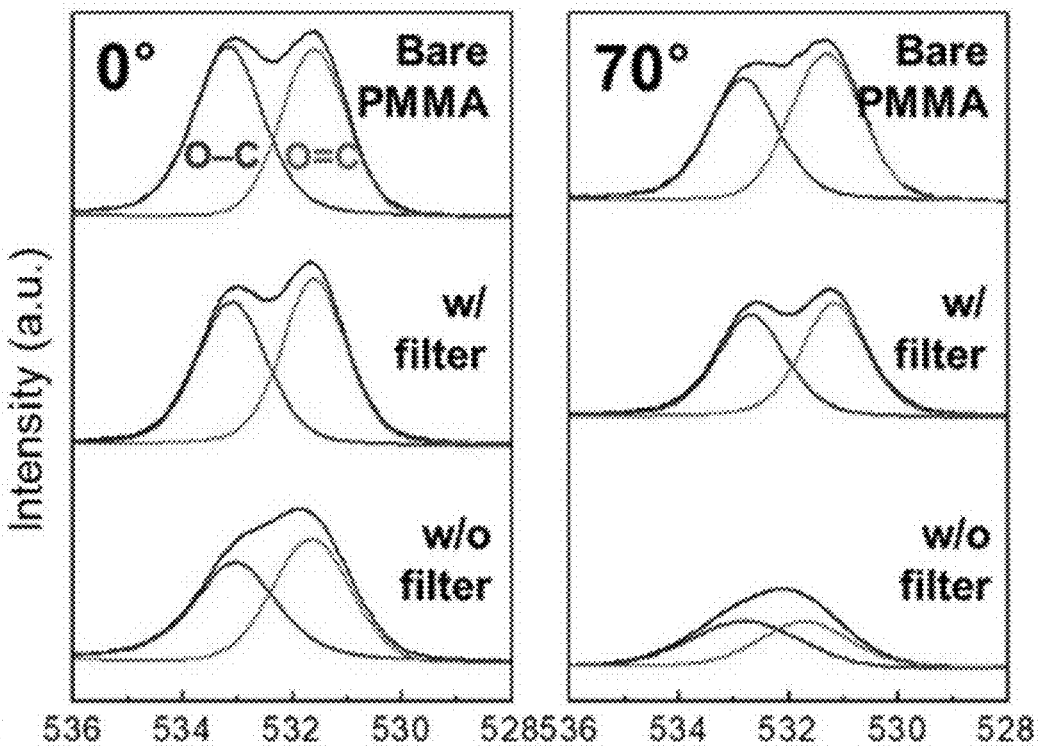

FIGS. 9A and 9B are graphs illustrating the results of X-ray photon spectroscopy (XPS) of the block copolymers according to Example 1 and Comparative Example 2. PS-b-PMMA films were obtained according to Example 1 and Comparative Example 2. FIG. 9A shows PS (C1s) XPS spectrum (incident angle 0°, 70°) of each of a pure PS film and PS-b-PMMA films according to Example 1 and Comparative Example 2, and FIG. 9B shows PMMA (O1s) XPS spectrum (incident angle 0°, 70°) of each of a pure PMMA film and PS-b-PMMA films according to Example 1 and Comparative Example 2.

As can be seen from FIGS. 9A and 9B, in the case of the PS-b-PMMA block copolymer film according to Example 1, the peaks are retained substantially as compared to PS and PMMS forming each block of the block copolymer. On the contrary, PS-b-PMMA block copolymer film according to Comparative Example 2 shows a shift in peaks. This suggests that the crosslinked layer formed by plasma using no filter undergoes a change in chemical composition, such as formation of a new bonding, while the crosslinked layer formed by plasma using a filter retains its chemical composition as it is. In other words, plasma treatment using a filter has no effect upon the chemical bonding of a block copolymer film.

Figure 10A:
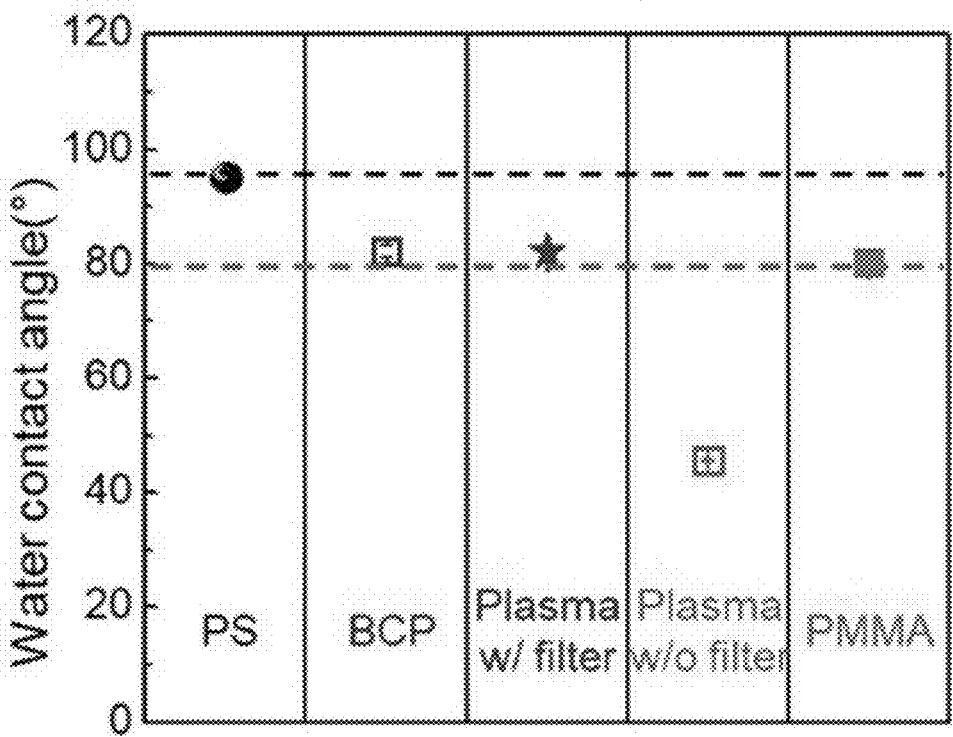
FIGS. 10A to 10C show the results of water contact angle determination of the block copolymers according to Example 1 and Comparative Example 2.
Figure 10B:
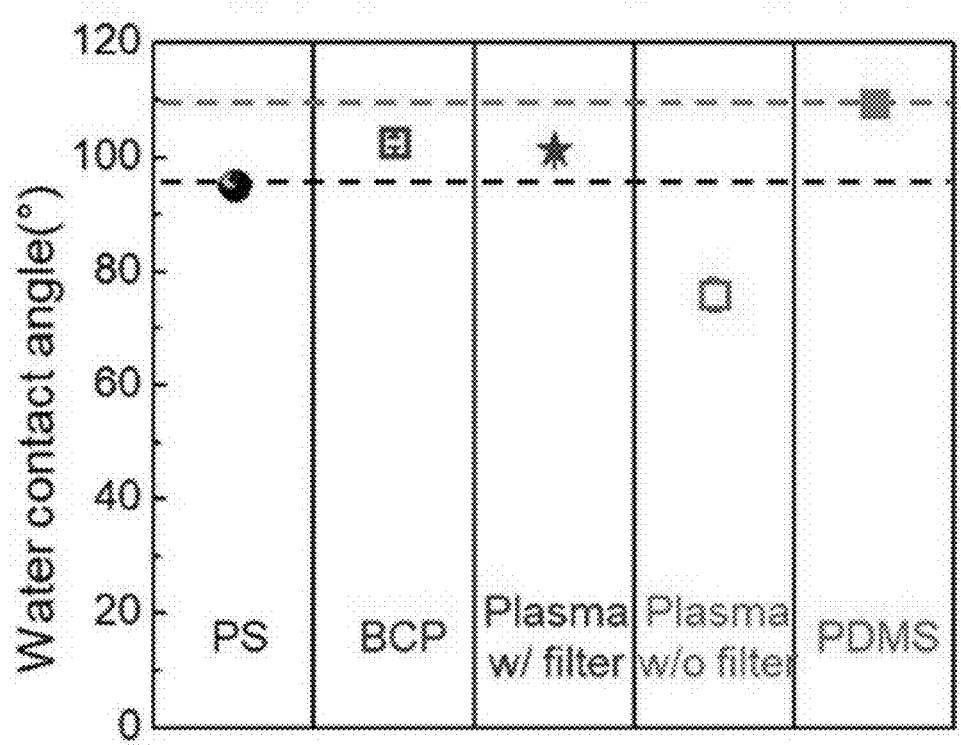
Figure 10C:
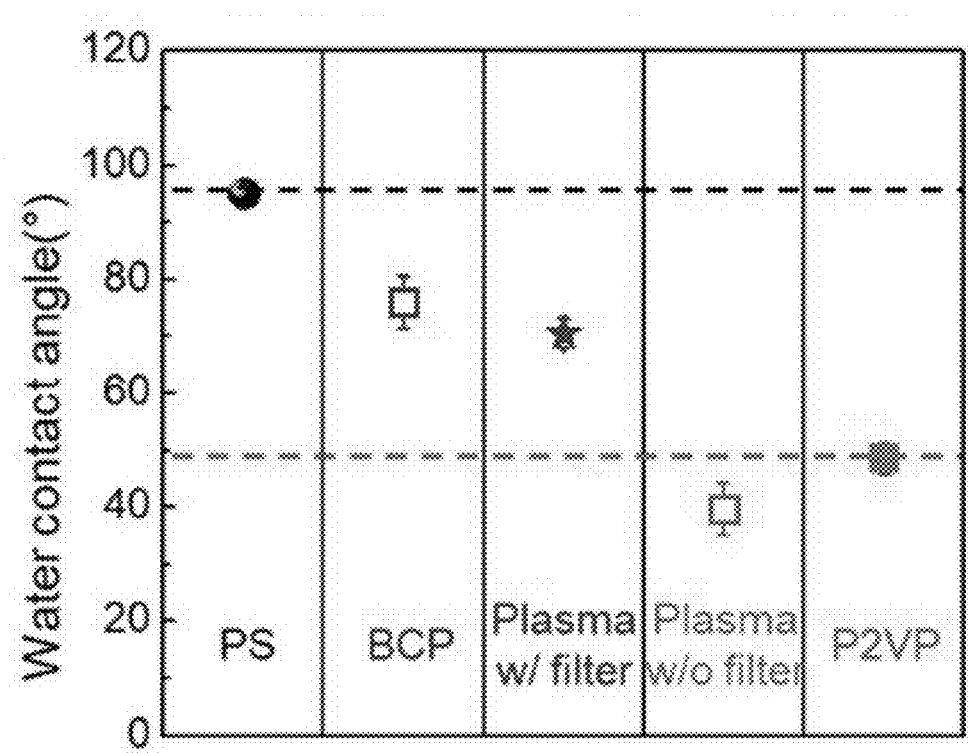

Meanwhile, FIGS. 10A to 10C show the results of water contact angle determination of the block copolymers according to Example 1 and Comparative Example 2. FIG. 10A shows the results of determination of water contact angle for PS, PS-b-PMMA, PS-b-PMMA according to Example 1, PS-b-PMMA according to Comparative Example 2 and PMMA, FIG. 10B shows the results of determination of water contact angle for PS, PS-b-PDMS, PS-b-PDMS according to Example 1, PS-b-PDMS according to Comparative Example 2 and PDMS, FIG. 10C shows the results of determination of water contact angle for PS, PS-b-P2VP, PS-b-P2VP according to Example 1, PS-b-P2VP according to Comparative Example 2 and P2VP.

As can be seen from FIGS. 10A to 10C, in the case of the block copolymer film subjected to plasma treatment using no filter, the water contact angle is reduced significantly as compared to the block copolymer. On the contrary, in the case of the block copolymer film subjected to plasma treatment using a filter, the water contact angle is not changed substantially. The water contact angle is within the range of water contact angles of blocks forming the block copolymer. This suggests that the plasma treatment using a filter does not affect the surface energy of the block copolymer.

Test Example 3. Determination of Thickness of Crosslinked Layer Depending on Filter Type To determine whether a crosslinked layer is formed or not depending on the ultraviolet ray transmission of a filter, filters having a different UV transmission were prepared.

A filter having a slit, line and dual-layer gap different from those of the filter used in Example 1 was prepared. UV-Vis spectroscopy was carried out to determine the light transmission with a wavelength of 100-500 nm of the filter.

Then, a crosslinked layer was formed in the same manner as the method for producing a block copolymer (PS-b-PMMA) film through top plasma treatment according to Example 1, except that the above-mentioned filter was used and annealing was not carried out. The block copolymer having the crosslinked layer formed by using the filter was examined through a scanning electron microscope to determine the thickness of the crosslinked layer and formation of wrinkles on the surface of the crosslinked layer. The results are shown in the following Table 1.

TABLE 1

| Filter transmission | Crosslinked layer thickness | Wrinkles on crosslinked layer |
|---|---|---|
| 0.0-1.0% | 1-3 nm | None |
| 1.0-5% | 3-5 nm | None |
| 5-10% | 5-10 nm | None |
| >10% | >10 nm | Yes |

As can be seen from Table 1, the thickness of crosslinked layer tends to be increased, as the light transmission with a wavelength of 100-500 nm of the filter is increased. Particularly, when the light transmission with a wavelength of 100-500 nm of the filter is larger than 10%, the resultant crosslinked layer has a significantly increased thickness. In addition, it can be seen that as the thickness of the crosslinked layer is increased rapidly, wrinkles are formed on the surface of crosslinked layer. Therefore, it can be seen that a filter having a light transmission of 10% or less is used preferably.

As can be seen from the foregoing, it is possible to form a crosslinked layer, which is mechanically stable and undergoes no chemical change, by subjecting the block copolymer surface to plasma treatment using a filter. It is also possible to obtain a vertically oriented block copolymer film by annealing the block copolymer film having such a crosslinked layer. The method for producing a vertically oriented block copolymer film according to the present disclosure is advantageous in that it can be applied for general purpose regardless of the chemical structure, type and morphology of a block copolymer, and the method can be applied generally to the conventional directed self assembly process.

While the present disclosure has been described with respect to the specific embodiments, it will be apparent to those skilled in the art that various changes and modifications may be made without departing from the spirit and scope of the disclosure as defined in the following claims.

What is claimed is:

1. A method for producing a vertically oriented block copolymer film, comprising the steps of:
  forming a block copolymer layer on a substrate;
  causing crosslinking on the surface of the block copolymer layer through plasma treatment using a filter to introduce a crosslinked layer; and
  carrying out annealing of the block copolymer layer having the crosslinked layer introduced thereto so that the nanostructure of the block copolymer layer may be vertically oriented,
  wherein the filter interrupts ultraviolet rays generated by the plasma.

2. A method for producing a vertically oriented block copolymer film, comprising the steps of:
  coating a block copolymer on a substrate;
  converting the coated block copolymer into a first crosslinked layer through plasma treatment using a filter;
  forming a block copolymer layer including the same block copolymer as the above-mentioned block copolymer on the first crosslinked layer; and
  carrying out annealing of the block copolymer layer formed on the first crosslinked layer so that the nanostructure of the block copolymer layer may be vertically oriented,
  wherein the filter interrupts ultraviolet rays generated by the plasma.

3. A method for producing a vertically oriented block copolymer film, comprising the steps of:
  coating a block copolymer on a substrate;
  converting the coated block copolymer into a first crosslinked layer through plasma treatment using a filter;
  forming a block copolymer layer including the same block copolymer as the above-mentioned block copolymer on the first crosslinked layer;
  causing crosslinking on the surface of the block copolymer layer through plasma treatment using a filter to introduce a second crosslinked layer; and
  carrying out annealing of the block copolymer layer including the first crosslinked layer and the second crosslinked layer so that the nanostructure of the block copolymer layer may be vertically oriented,
  wherein the filter interrupts ultraviolet rays generated by the plasma.

4. The method for producing a vertically oriented block copolymer film according to claim 1, wherein the filter has a light transmission of 10% or less to the light with a wavelength of 100-500 nm as determined by UV-Vis spectroscopy, and the crosslinked layer has a thickness of 1-10 nm.

5. The method for producing a vertically oriented block copolymer film according to claim 2, wherein the filter has a light transmission of 10% or less to the light with a wavelength of 100-500 nm as determined by UV-Vis spectroscopy, and the crosslinked layer has a thickness of 1-10 nm.

6. The method for producing a vertically oriented block copolymer film according to claim 3, wherein the filter has a light transmission of 10% or less to the light with a wavelength of 100-500 nm as determined by UV-Vis spectroscopy, and the crosslinked layer has a thickness of 1-10 nm.

7. The method for producing a vertically oriented block copolymer film according to claim 1, wherein the filter interrupts ultraviolet rays and ions generated from plasma at the same time.

8. The method for producing a vertically oriented block copolymer film according to claim 2, wherein the filter interrupts ultraviolet rays and ions generated from plasma at the same time.

9. The method for producing a vertically oriented block copolymer film according to claim 3, wherein the filter interrupts ultraviolet rays and ions generated from plasma at the same time.

10. The method for producing a vertically oriented block copolymer film according to claim 1, wherein the plasma treatment uses inert gas plasma or air plasma.

11. The method for producing a vertically oriented block copolymer film according to claim 2, wherein the plasma treatment uses inert gas plasma or air plasma.

12. The method for producing a vertically oriented block copolymer film according to claim 3, wherein the plasma treatment uses inert gas plasma or air plasma.

13. The method for producing a vertically oriented block copolymer film according to claim 1, wherein the block copolymer comprises a first block and a second block, and the crosslinked layer has a water contact angle between the water contact angle of the first block and that of the second block.

14. The method for producing a vertically oriented block copolymer film according to claim 2, wherein the block copolymer comprises a first block and a second block, and the crosslinked layer has a water contact angle between the water contact angle of the first block and that of the second block.

15. The method for producing a vertically oriented block copolymer film according to claim 3, wherein the block copolymer comprises a first block and a second block, and the crosslinked layer has a water contact angle between the water contact angle of the first block and that of the second block.

16. A method for producing a directed self-assembled pattern, comprising the steps of:
 preparing a substrate having a guide pattern;
 forming a block copolymer layer on the substrate having a guide pattern;
 causing crosslinking on the surface of the block copolymer layer through plasma treatment using a filter to introduce a crosslinked layer; and
 carrying out annealing of the block copolymer layer having the crosslinked layer introduced thereto so that the nanostructure of the block copolymer layer may be vertically oriented,
 wherein the filter interrupts ultraviolet rays generated by the plasma.

17. The method for producing a directed self-assembled pattern according to claim 16, wherein the filter has a light transmission of 10% or less to the light with a wavelength of 100-500 nm as determined by UV-Vis spectroscopy, and the crosslinked layer has a thickness of 1-10 nm.

18. The method for producing a directed self-assembled pattern according to claim 16, wherein the filter interrupts ultraviolet rays and ions generated from plasma at the same time.

19. The method for producing a directed self-assembled pattern according to claim 16, wherein the plasma treatment uses inert gas plasma or air plasma.

20. The method for producing a directed self-assembled pattern according to claim 16, wherein the block copolymer comprises a first block and a second block, and the crosslinked layer has a water contact angle between the water contact angle of the first block and that of the second block.

* * * * *